(12) United States Patent
Chen et al.

(10) Patent No.: US 8,377,185 B2
(45) Date of Patent: Feb. 19, 2013

(54) DUST REMOVAL SYSTEM FOR DUST GAS

(75) Inventors: Xuemin Chen, Guangdong (CN); Qingdong Ye, Guangdong (CN); Sihai Zhou, Guangdong (CN)

(73) Assignee: Shenzhen Sunxing Light Alloys Materials Co., Ltd., Guangdong (CN)

( * ) Notice: Subject to any disclaimer, the term of this patent is extended or adjusted under 35 U.S.C. 154(b) by 0 days.

(21) Appl. No.: 13/056,729

(22) PCT Filed: Oct. 29, 2010

(86) PCT No.: PCT/CN2010/078221
§ 371 (c)(1),
(2), (4) Date: Jan. 31, 2011

(87) PCT Pub. No.: WO2012/006835
PCT Pub. Date: Jan. 19, 2012

(65) Prior Publication Data
US 2012/0118161 A1    May 17, 2012

(30) Foreign Application Priority Data
Jul. 16, 2010    (CN) .......................... 2010 1 0229275

(51) Int. Cl.
*B01D 47/00*    (2006.01)
*B01D 53/14*    (2006.01)

(52) U.S. Cl. ............... 96/240; 96/209; 96/210; 96/234; 96/243; 96/265; 96/267; 96/281; 96/303; 96/306; 96/311; 96/313; 239/338; 239/370; 239/601; 261/3; 261/79.2; 261/81

(58) Field of Classification Search ............... 96/24–14, 96/234, 240, 243–379; 261/75–126; 239/338, 239/340–346, 352–354, 370, 426, 432–434
See application file for complete search history.

(56) References Cited

U.S. PATENT DOCUMENTS

| | | | | |
|---|---|---|---|---|
| 1,377,594 A * | 5/1921 | Lissauer | ......................... | 96/265 |
| 1,622,482 A * | 3/1927 | Bahnson | ........................ | 96/240 |
| 2,012,962 A * | 9/1935 | Hagar | .............................. | 96/237 |
| 2,163,474 A * | 6/1939 | Sloan | .............................. | 261/30 |
| 2,387,473 A * | 10/1945 | Spitzka | ........................ | 96/233 |
| 2,396,526 A * | 3/1946 | Edvin | ............................. | 96/265 |
| 3,485,012 A * | 12/1969 | Deussner | .......................... | 95/2 |
| 4,595,542 A * | 6/1986 | Jones | ............................. | 261/53 |
| 5,203,891 A * | 4/1993 | Lema | ............................. | 96/210 |
| 6,811,709 B2 * | 11/2004 | Arnaud | ........................ | 210/750 |
| 2005/0061154 A1 * | 3/2005 | Hogan | ........................... | 96/281 |
| 2012/0118161 A1 * | 5/2012 | Chen et al. | ..................... | 96/240 |

* cited by examiner

*Primary Examiner* — Bao Thuy L Nguyen
*Assistant Examiner* — Joubert X Glover
(74) *Attorney, Agent, or Firm* — Jackson IPG PLLC

(57) ABSTRACT

This invention is a dust removal system for dust gas which comprises at least an atomizer. The atomizer comprises an atomizing chamber and an atomizing mechanism; the atomizing chamber includes an inlet for the dust gas and an outlet for the gas after mixture; the atomizing mechanism comprises a water chamber, the first atomizing ball, the second atomizing ball, an umbrella-shaped atomizer, and a regulating mechanism; the water chamber includes the first and second water inlet and the first and second water outlet; the regulating mechanism adjusts the fit clearance between the first atomizing ball and the first water outlet, the fit clearance between the second atomizing ball and the second water outlet, and the flare angle of the umbrella surface of the umbrella-shaped atomizer. The beneficial effect is: the two-stage atomization—coordinating the atomizing balls and the water outlets, and using an umbrella-shaped atomizer—guarantees the atomizing effect. When there are burrs accumulating in and/ or corroding the water outlets, regulate the fit clearances between the atomizing balls and the water outlets to remove completely the influence of the blockage on the atomizing effect.

9 Claims, 6 Drawing Sheets

DUST REMOVAL SYSTEM FOR DUST GAS

BACKGROUND OF THE INVENTION

1. Field of the Invention

This invention relates to the field of dust removal technology, more specifically to a dust removal system for dust gas.

2. Description of the Related Arts

In the present metal processing industry, lots of dust gas is produced in the process of machining of metals. The dust in the dust gas comprises mostly different compounds.

For example, in the productive process of aluminum-titanium-boron alloy, the produced dust includes the following components: $BF_3$, $AlF_3$, $Al_2O_3$, $KAlF_4$, $K_2TiF_6$, $K_8F_4$ and the dust mixes with air to form dust gas. The water mixture formed after the contact between this dust and NaOH solution has the following characteristics: first, high viscosity with high probability to adhere to metal surfaces; second, high probability to agglomerate with high speed of coagulation; third, corrosion to the metal in contact when the water mixture adheres to metal surfaces.

Presently, there are mainly three kinds of dust removal equipments:

The first kind is bag-type dust removal device, as shown in FIG. 1, wherein multiple bags 22 are set parallel along the radial direction of the collection chamber 20. The dust gas enters the device from the inlet of the collection chamber 20, passes through the micro-holes of the bags 22, and gets out from the outlet of the collection chamber 20. The micro-holes of the bags have a certain size, gas and dust with smaller sizes than the certain size can get through the bags, while dust with larger sizes than the certain size is filtered out and accumulates in the bags. This kind of bag-type dust removal device can filter dust gas, however, dust with high viscosity and high probability to agglomerate would easily block the micro-holes of the bags so that gas could not go through the device normally and the device is out of action. And the working life of this kind of device is very short; usually this device can work properly for only around 6 hours.

The second kind is fan-leaf-type dust removal device, as shown in FIG. 2, wherein a rotary fan body 23 is set in the atomizing chamber 21. There are two openings in the atomizing chamber 21; water flows in the atomizing chamber 21 from the upper opening and hits the rotary fan body 23 to form water mist; and the dust gas flows in the atomizing chamber 21 from the lower opening and mixes with the water mist to remove the dust in the dust gas. However, dust with corrosion effect would easily adhere to the surfaces of the fan body 23 and corrode the fan body, so that the atomization effect for water of the fan body is reduced.

The third kind is dense-spout-type dust removal device, as shown in FIG. 3, wherein a tubular water chamber 24 is set in the atomizing chamber 21, and dense small spouts 25 are set in the wall of the water chamber. Water flows in from the inlet of the water chamber 24 and sprays out from the dense small spouts 25 to form water mist, and the water mist mixes with the dust gas to remove the dust in the dust gas. However, when water sprays through the dense small spouts, vapor-water mixture surrounds the dense small spouts, so burrs have a high probability to accumulate on the surfaces of the spouts in contact with the vapor-water mixture, so that spouts are blocked slowly to reduce the atomization effect and at the same time are corroded to reduce the working life of this device. The necessity to clear burrs frequently in the process of using this device raises labor intensity and reduces the efficiency of removing dust.

So present dust removal equipments can not have stable, effective, and continually dust collection effect for the dust gas with compound dust.

SUMMARY OF THE INVENTION

To resolve the present technical problems, this invention provides a dust removal system for dust gas. This system has a two-stage atomization—coordinating the atomizing balls and the water outlets, and using umbrella-shaped atomizer—to guarantee the atomizing effect, and at the same time to solve the present blocking and corrosion problems without increasing the clearing work and affecting the working life.

This invention provides a dust removal system to solve the present technical problems. This system comprises at least an atomizer, wherein the atomizer comprises an atomizing chamber and an atomizing mechanism set in the atomizing chamber. The atomizing chamber includes an inlet for the dust gas and an outlet for the gas after mixture; the atomizing mechanism includes a water chamber, the first and second atomizing ball, an umbrella-shaped atomizer and a regulating mechanism; the water chamber includes the first and second water inlet, and the first and second water outlet. The first and second water inlets are set oppositely, and the center line of the water inlets is perpendicular to the center line of the water outlets; the first atomizing ball is set in coordination with the first water outlet, and the second atomizing ball is set in coordination with the second water outlet; the umbrella-shaped atomizer is set below the second atomizing ball; the regulating mechanism adjusts the fit clearance between the first atomizing ball and the first water outlet, the fit clearance between the second atomizing ball and the second water outlet, and the flare angle of the umbrella surface of the umbrella-shaped atomizer.

Further improvements of this invention are made, including:

the regulating mechanism includes the first, the second and the third regulating unit, wherein the first regulating unit is in connection with and in control of the motion of the first atomizing ball, the second regulating unit is in connection with and in control of the motion of the second atomizing ball, and the third regulating unit is in connection with the umbrella-shaped atomizer and in control of the motion of the umbrella surface of the umbrella-shaped atomizer;

the regulating mechanism also includes the fourth and the fifth regulating unit, wherein the fourth regulating unit is in connection with and in control of the motion of the first atomizing ball, and the fifth regulating unit is connected to the second atomizing ball and the umbrella-shaped atomizer;

there are multiple atomizers, and they are connected in series orderly;

the first and second water outlets are round; the first and second atomizing balls are spherical; the first atomizing ball, the first water outlet, the second water outlet, the second atomizing ball, and the umbrella-shaped atomizer are set orderly from top to bottom, and their centers are in line;

there are indentations on the side of the umbrella surface towards the water chamber; the top of the umbrella-shaped atomizer is embedded in the second atomizing ball, so when the second regulating unit drives the second atomizing ball to move, the umbrella-shaped atomizer moves simultaneously; the third regulating unit is hinged to the umbrella surface to adjust the flare angle of the surface;

the dust removal system includes a gas-liquid separation mechanism, wherein the gas-liquid separation mechanism includes a liquid outlet at the bottom and a gas outlet on the top, and the gas-liquid separation mechanism connects to the outlet for the gas after mixture;

the dust removal system includes an exhaust mechanism, wherein the exhaust mechanism includes an exhaust pump and an exhaust pipe, and the exhaust pipe connects to the gas outlet;

the dust removal system includes a sediment basin and the liquid outlet connects to the inner cavity of the sediment basin;

the dust removal system includes a filtering mechanism, wherein the filtering mechanism includes a sewage pump and a plate-frame filter, the bottom of the sediment basin connects to the plate-frame filter through the sewage pump, and the output water from the plate-frame filter flows into the sediment basin;

the dust removal system includes a water-transport mechanism, wherein the water-transport mechanism includes a water-transport pump and a water-transport conduit, the water-transport pump connects to the top of the sediment basin, and the water-transport conduit connects to the first and second water outlet separately after split-flow.

Compared with the prior art, the beneficial effect of this invention is: the two-stage atomization—coordinating the atomizing balls and the water outlets, and using an umbrella-shaped atomizer—guarantees the atomizing effect. When there are burrs accumulating in the water outlets, the size of the water outlets would decrease; regulate the fit clearances between the atomizing balls and the water outlets to remove completely the influence of the blockage on the atomizing effect. When there are burrs corroding the water outlets, the size of the water outlets would increase; regulate the fit clearances between the atomizing balls and the water outlets to remove completely the influence of the corrosion on the atomizing effect. According to the concentration of dust in the dust gas, correspondingly regulate the fit clearances between the atomizing balls and the water outlets to improve the atomizing effect for water. And properly regulate the flare angle of the umbrella surface of the umbrella-shaped atomizer to further improve the atomizing effect. So there are better atomizing effect and better contact effect between the water and the dust.

DETAILED DESCRIPTION OF PREFERRED EMBODIMENTS

Further description of this invention is made now through an embodiment of the invention and the accompanying drawings.

Figure 1:
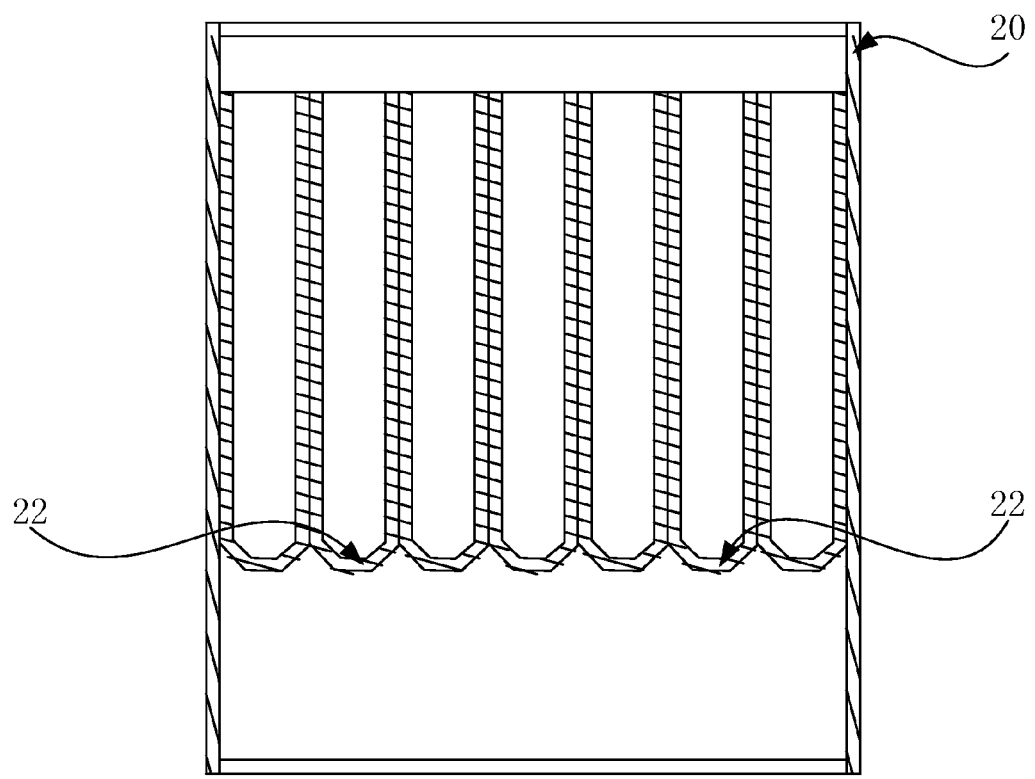
FIG. 1 is a structural schematic diagram of the bag-type dust removal device of the prior art.
Figure 2:
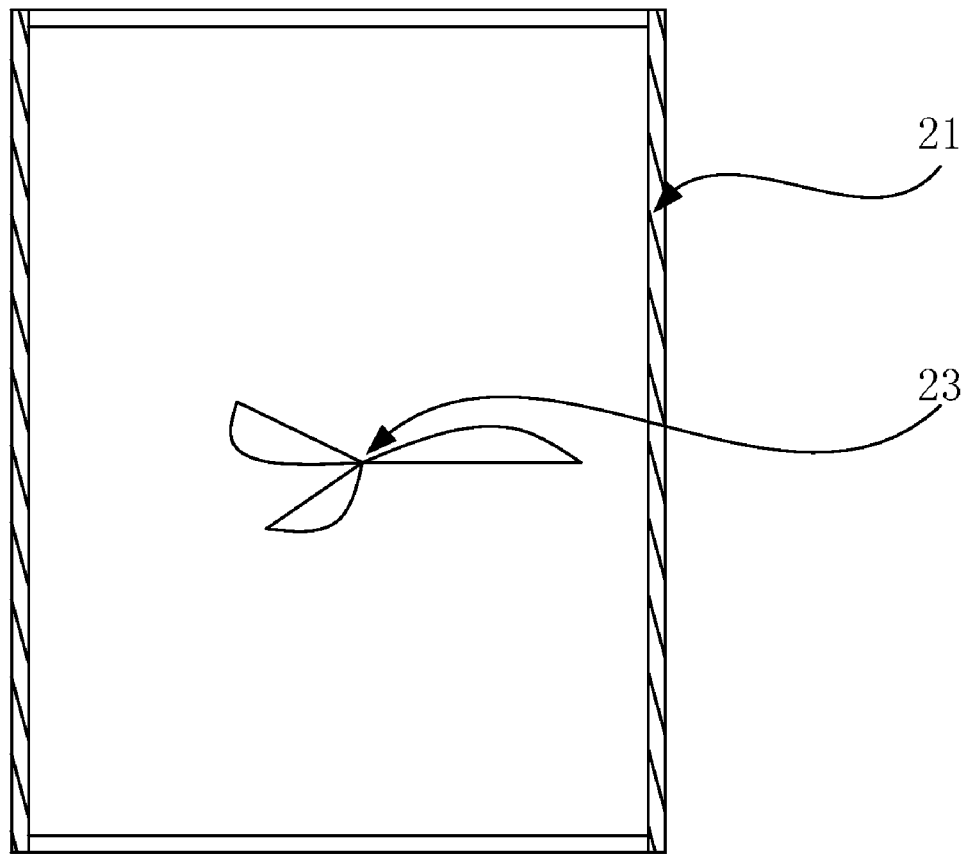
FIG. 2 is a structural schematic diagram of the fan-leaf-type dust removal device of the prior art.
Figure 3:
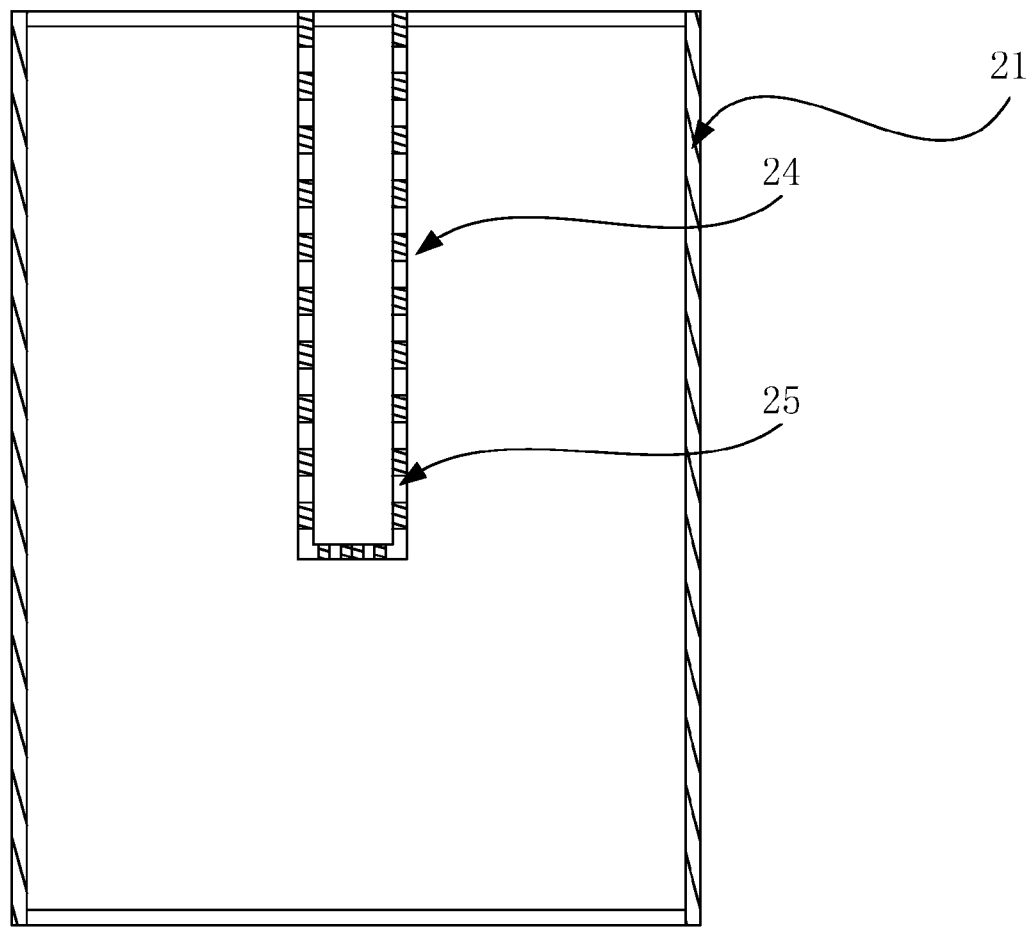
FIG. 3 is a structural schematic diagram of the dense-spout-type dust removal device of the prior art.
Figure 4:
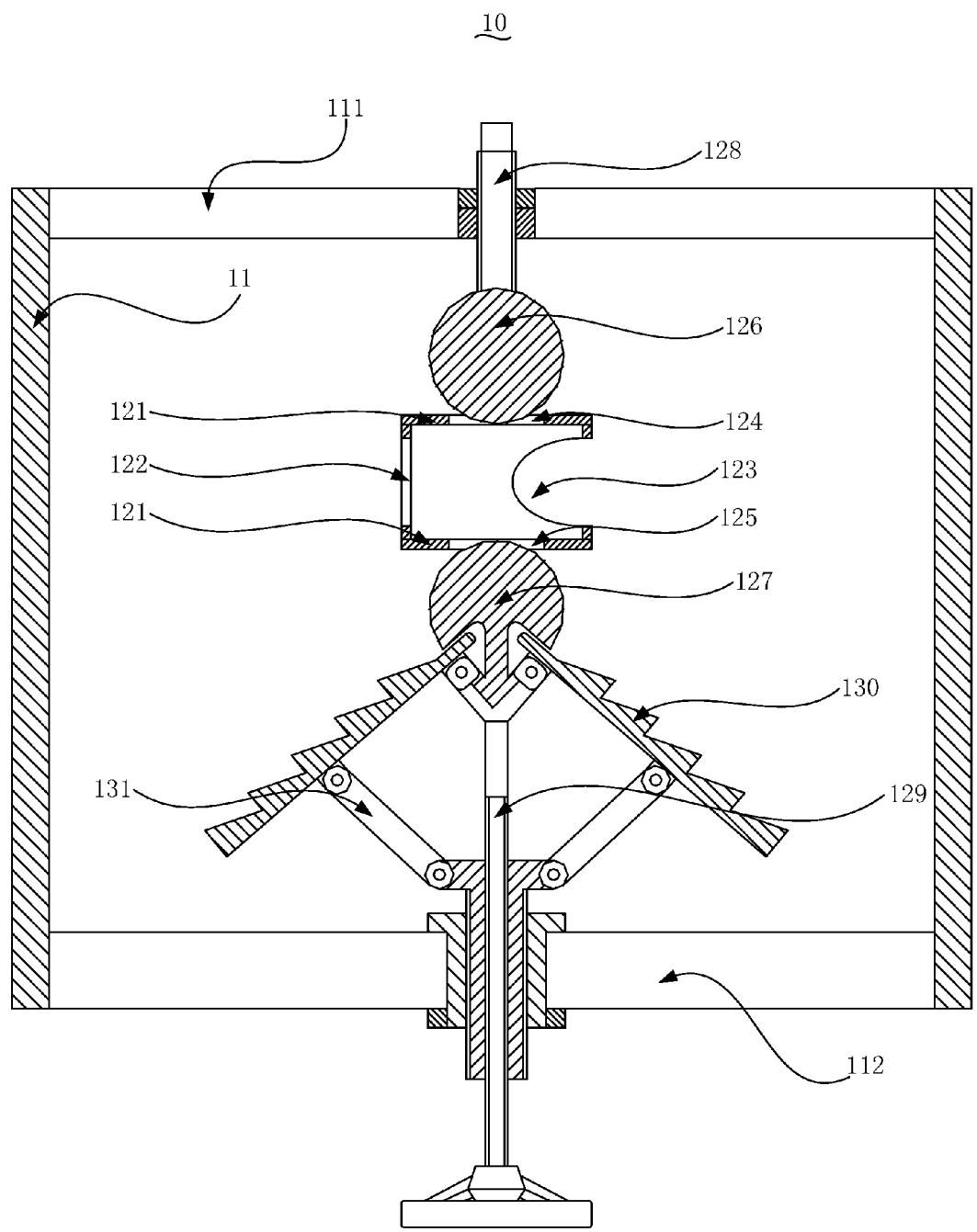
FIG. 4 is a structural schematic diagram of the atomizer of the dust removal system of this invention.
Figure 5:
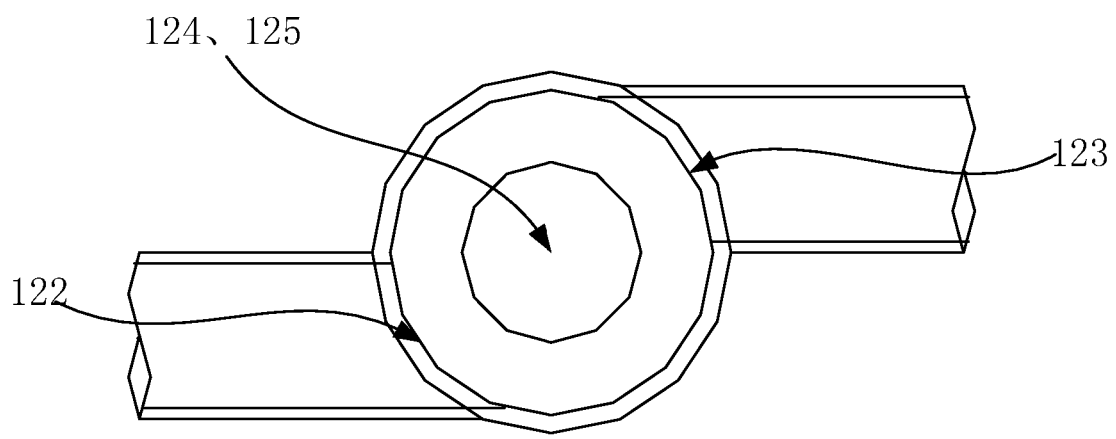
FIG. 5 is a structural schematic diagram of the water chamber.
Figure 6:
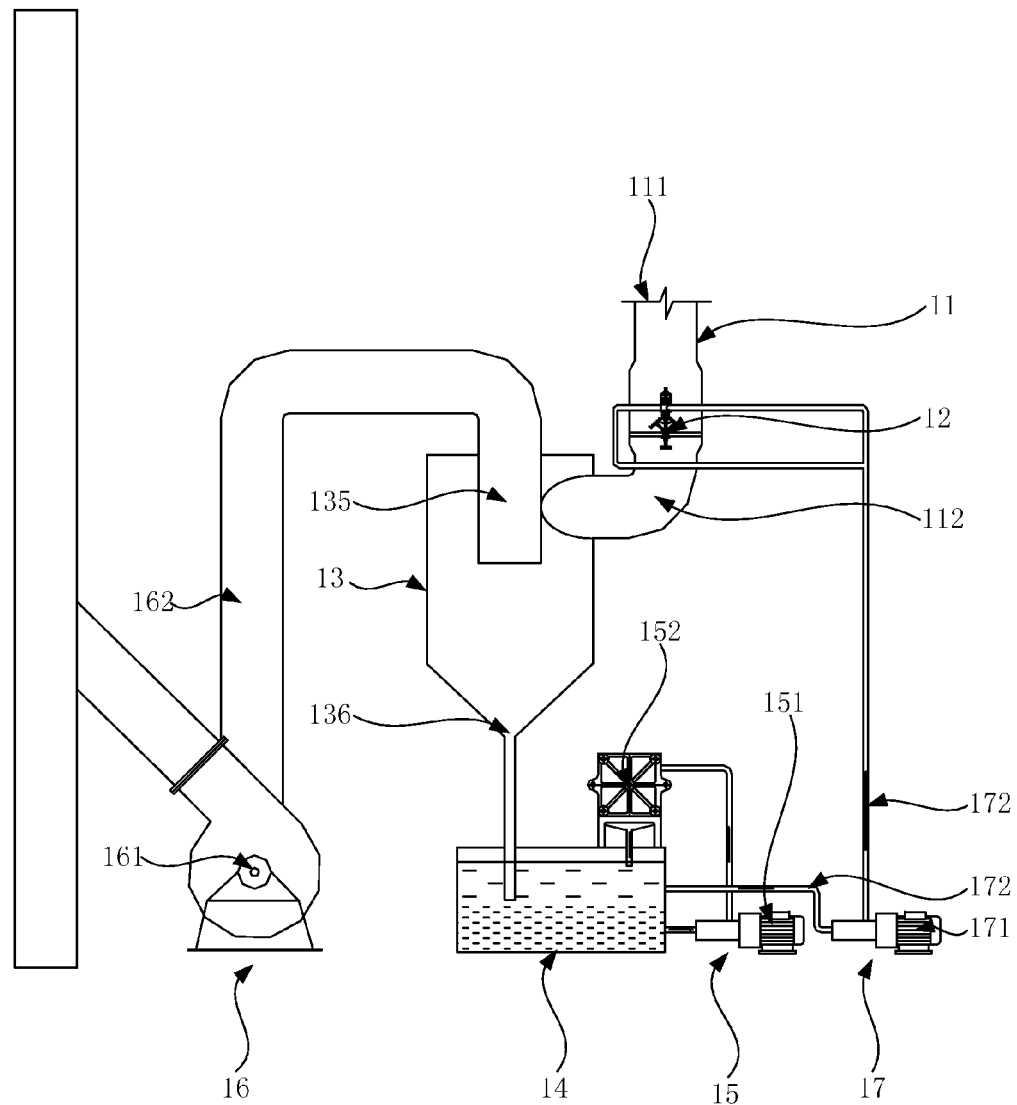
FIG. 6 is a schematic diagram of an embodiment of the dust removal system of this invention.

As shown in FIGS. 4, 5, and 6, a dust removal system for the dust gas includes an atomizer 10 which is used to mix the dust gas and water mist so that the water mist can absorb the dust in the dust gas to remove or reduce the concentration of dust in the dust gas, or is specially used to collect dust. The atomizer 10 includes an atomizing chamber 11 and an atomizing mechanism 12 set in the atomizing chamber 11. The atomizing chamber 11 includes an inlet for dust gas 111 and an outlet for gas after mixture 112; dust gas flows in atomizing chamber 11 from the inlet for the dust gas 111, contacts with water mist, and flows out from the outlet for the gas after mixture 112. The atomizing mechanism 12 is used to transform water flow to water mist; the dust gas and water mist in the atomizing chamber 11 has certain pressure. The atomizing mechanism 12 includes a water chamber 121, the first atomizing ball 126, the second atomizing ball 127, an umbrella-shaped atomizer 130 and a regulating mechanism; the water chamber 121 includes the first water inlet 122, the second water inlet 123, the first water outlet 124 and the second water outlet 125; the first and second water inlets 122 and 123 are set oppositely, and the center line of the first and second water inlets 122 and 123 is perpendicular to the center line of the first and second water outlets 124 and 125; the first atomizing ball 126 is set to coordinate with the first water outlet 124; the second atomizing ball 127 is set to coordinate with the second water outlet 125; the umbrella-shaped atomizer 130 is set below the second atomizing ball 127; the regulating mechanism adjusts the fit clearance between the first atomizing ball 126 and the first water outlet 124, the fit clearance between the second atomizing ball 127 and the second water outlet 125, and the flare angle of the umbrella surface of the umbrella-shaped atomizer 130. The first atomizing ball 126 is used to coordinate with the first water outlet 124 to transform water flow ejected from the first water outlet 124 to water mist; The second atomizing ball 127 is used to coordinate with the second water outlet 125 to transform water flow ejected from the second water outlet 125 to water mist; the umbrella-shaped atomizer 130 is set at the bottom of the atomizing mechanism 12 to further atomize the water mist hitting against its umbrella surface to improve the atomizing effect.

The regulating mechanism in this invention can separately control fit clearance between the first atomizing ball 126 and the first water outlet 124, the fit clearance between the second atomizing ball 127 and the second water outlet 125, and the flare angle of the umbrella surface of the umbrella-shaped atomizer 130, or can correlatedly control two fit clearances and the flare angle of the umbrella surface. If it is in separate control, the regulating mechanism includes the first regulating unit 128, the second regulating unit 129 and the third regulating unit 131; the first regulating unit 128 is in connection with and in control of the motion of the first atomizing ball 126; the second regulating unit 129 is in connection with and in control of the motion of the second atomizing ball 127; the third regulating unit 131 is in connection with the umbrella-shaped atomizer 130 and in control of the motion of the umbrella surface of the umbrella-shaped atomizer 130. If it is in correlated control, the regulating mechanism includes the fourth regulating unit and the fifth regulating unit; the fourth regulating unit is in connection with and in control of the motion of the first atomizing ball 126; the fifth regulating unit is connected to the second atomizing ball 127 and the umbrella-shaped atomizer 130, when the fit clearance between the second atomizing ball 127 and the second water outlet 125 is decreased, the flare angle of the umbrella surface is decreased simultaneously, and when the fit clearance between the second atomizing ball 127 and the second water outlet 125 is increased, the flare angle of the umbrella surface is increased simultaneously.

The dust system of this invention can use only one atomizer or use several atomizers in series, depending on the dust-removal level in demand.

The first atomizing ball 126 is set to coordinate with the first water outlet 124; the second atomizing ball 127 is set to coordinate with the second water outlet 125; the sizes of the clearances between the atomizing balls and the water outlets relate to the atomizing effect, so moderately regulate the fit clearances between the atomizing balls and the water outlets using the regulating mechanism. The umbrella-shaped atomizer 130 is set bellow the second atomizing ball 127; because of the gravity hitting, the water mist or water droplets contacting with the sides of the umbrella-shaped atomizer 130 can be further atomized. The preferred first and second water outlets in the invention are round; the first atomizing ball 126, the first water outlet 124, the second water outlet 125, the second atomizing ball 127, and the umbrella-shaped atomizer 130 are set orderly from top to bottom, and their centers are in line.

There are indentations on the side of the umbrella surface towards the water chamber 121 to increase the superficial area of the upper side of the umbrella surface and change the directions of the water mist or water droplets hitting on the indentations to improve the atomizing effect.

The umbrella-shaped atomizer 130 can be set separately from the second atomizing ball 127 or directly connect with the second atomizing ball 127. If they are connected together, the top of the umbrella-shaped atomizer 130 is embedded in the second atomizing ball 127, so when the second regulating unit 129 drives the second atomizing ball 127 to move, the umbrella-shaped atomizer 130 moves simultaneously, then the second atomizing ball 127 and the umbrella-shaped atomizer have a linear movement in the up and down direction. And the third regulating unit is hinged to the umbrella surface to adjust the flare angle of the surface.

The dust removal system of this invention includes a gas-liquid separation mechanism 13; the gas-liquid separation mechanism includes a liquid outlet 136 at the bottom and a gas outlet 135 on the top, and the gas-liquid separation mechanism 13 and the outlet for the gas after mixture 112 are interconnected. Because of the gravity difference, after dust gas entering the gas-liquid separation mechanism 13, the lighter clean gas flows out from the gas outlet on the top, and the heavier water droplets with dust converge to exhaust from the liquid outlet 136.

The dust removal system of this invention includes an exhaust mechanism 16, wherein the exhaust mechanism 16 includes an exhaust pump 161 and an exhaust pipe 162, and the exhaust pipe 162 connects to the gas outlet 135. The exhaust pipe 162 is set connected to the gas outlet 135, so that the clean gas can be exported along the exhaust pipe 162; and the exhaust pump 161 is set to help the gas flow effectively.

The dust removal system of this invention includes a sediment basin 14 and the liquid outlet 136 is connected to the inner cavity of the sediment basin 14. Through the liquid outlet 136, the water droplets with dust converge to flow into and accumulate in the sediment basin 14 to form waste water; further disposal of the waste water can separate the clean water and the residue.

The dust removal system of this invention includes a filtering mechanism 15, wherein the filtering mechanism includes a sewage pump 151 and a plate-frame filter 152. The bottom of the sediment basin 14 connects to the plate-frame filter 152 through the sewage pump 151; the sewage pump 151 transports the waste water to the plate-frame filter 152; the plate-frame filter 152 is used to separate the water and the residue and the output water from the plate-frame filter 152 flows into the sediment basin 14.

The dust removal system of this invention includes a water-transport mechanism 17, wherein the water-transport mechanism 17 includes a water-transport pump 171 and a water-transport conduit 172. The water-transport pump 171 connects to the top of the sediment basin 14, so that water can be recycled and reused and that the pollution and waste from the leaking out can be avoided; and the water-transport conduit 172 connects to the first and second water outlet separately after split-flow.

In this invention, the two-stage atomization—coordinating the atomizing balls and the water outlets and using an umbrella-shaped atomizer—is used to guarantee the atomizing effect. When there are burrs accumulating in the water outlets, regulate the fit clearances between the atomizing balls and the water outlets to remove completely the influence of the blockage on the atomizing effect. When there are burrs corroding the water outlets, regulate the fit clearances between the atomizing balls and the water outlets to remove completely the influence of the corrosion on the atomizing effect. According to the concentration of dust in the dust gas, correspondingly regulate the fit clearances between the atomizing balls and the water outlets to improve the atomizing effect of water. And properly regulate the flare angle of the umbrella surface of the umbrella-shaped atomizer to further improve the atomizing effect. So there are better atomizing effect and better contact effect between the water and the dust.

While further detailed descriptions of this invention have been given above in connection with a preferred embodiment, it should not be understood that this invention is limited to the disclosed embodiment. It will be apparent to those skilled in the art that various modifications and equivalent arrangements can be made under the protection of this invention without departing from the spirit and scope of the invention.

What is claimed is:

1. An atomizer, comprising an atomizing chamber and an atomizing mechanism set in the chamber, the chamber including an inlet for the dust gas and an outlet for the gas after mixture, wherein said atomizing mechanism comprises a water chamber, a first atomizing ball, a second atomizing ball, an umbrella-shaped atomizer, and a regulating mechanism;

said water chamber includes a first water inlet, a second water inlet, a first water outlet and a second water outlet; said first and second water inlets are set oppositely, and a center line of the water inlets is perpendicular to the center line of the water outlets;

said first atomizing ball is set to coordinate with said first water outlet; said second atomizing ball is set to coordinate with said second water outlet; said umbrella-shaped atomizer is set below said second atomizing ball;

said regulating mechanism adjusts the fit clearance between said first atomizing ball and said first water outlet, the fit clearance between said second atomizing ball and said second water outlet, and the flare angle of the umbrella surface of said umbrella-shaped atomizer.

2. The atomizer of claim 1, wherein said regulating mechanism includes a first regulating unit, a second regulating unit, and a third regulating unit, wherein said first regulating unit is in connection with and in control of the motion of said first atomizing ball, said second regulating unit is in connection with and in control of the motion of said second atomizing ball, and said third regulating unit is in connection with said umbrella-shaped atomizer and in control of the motion of the umbrella surface of said umbrella-shaped atomizer.

3. The atomizer of claim 1, wherein said regulating mechanism includes a fourth regulating unit and a fifth regulating unit, wherein said fourth regulating unit is in connection with and in control of the motion of said first atomizing ball, and said fifth regulating unit is connected to said second atomizing ball and said umbrella-shaped atomizer.

4. The atomizer of claim 1, further comprising multiple said atomizers, connected in series.

5. The atomizer of any one of claims 1, 2, 3, and 4, wherein said first and second water outlets are round; said first and second atomizing balls are spherical; said first atomizing ball, said first water outlet, said second water outlet, said second atomizing ball, and said umbrella-shaped atomizer are set orderly from top to bottom, and their centers are in line.

6. The atomizer of claim 2, wherein there are indentations on the side of the umbrella surface towards the water chamber; and the top of said umbrella-shaped atomizer is embedded in said second atomizing ball, such that when said second regulating unit drives said second atomizing ball to move, said umbrella-shaped atomizer moves simultaneously; said third regulating unit is hinged to said umbrella surface to adjust the flare angle of the surface.

7. The atomizer of any one of claims 1, 2, 3, and 4, further comprising a dust removal system having a gas-liquid separation unit, wherein said gas-liquid separation unit includes a liquid outlet at a bottom side and a gas outlet on a top side, and said gas-liquid separation is connected to the atomizing chamber outlet.

8. The atomizer of claim 7, further comprising an exhaust unit, wherein said exhaust unit includes an exhaust pump and an exhaust pipe, and said exhaust pipe connects to the outlet of said gas-liquid separating unit.

9. The atomizer of claim 7, further comprising a sediment basin, having a bottom and a top, and the liquid outlet connects to inner cavity of said gas-liquid separating unit.

* * * * *